May 20, 1952 R. MASUY 2,597,355
SETWORK FOR REGULATING THE THICKNESS OF THE BOARDS
CUTOFF IN RECIPROCATING-CARRIAGE SAWMILLS
Filed March 22, 1950 2 SHEETS—SHEET 1

INVENTOR:
RODOLPHE MASUY

May 20, 1952   R. MASUY   2,597,355
SETWORK FOR REGULATING THE THICKNESS OF THE BOARDS
CUTOFF IN RECIPROCATING-CARRIAGE SAWMILLS
Filed March 22, 1950   2 SHEETS—SHEET 2

INVENTOR:
RODOLPHE MASUY
BY: Michael D. Stricker

Patented May 20, 1952

2,597,355

UNITED STATES PATENT OFFICE 2,597,355

SETWORK FOR REGULATING THE THICKNESS OF THE BOARDS CUT OFF IN RECIPROCATING-CARRIAGE SAWMILLS

Rodolphe Masuy, Signy-le-Petit, France

Application March 22, 1950, Serial No. 151,235
In France April 15, 1949

12 Claims. (Cl. 143—120)

My invention has for its object automatic adjusting means for the depth of the saw cut of a power saw. Power saws for logs include generally a ribbon saw or circular saw blade, a carriage adapted to move in front of the saw blade and a log carrier adapted to be shifted over the carriage in order to bring the log nearer or further away from the saw and to adjust the depth of the saw cut. In power saws used heretofore, the shifting of the log carrier requires the presence of a workman for controlling and adjusting said movement under the supervision of the foreman who controls the movements of the carriage itself.

The power saws now in use require therefore the presence of two workmen and very often furthermore the depth of the saw cut is not constant.

My invention removes these drawbacks and allows an automatic adjustment of the log carrier, whereby no workman is required any longer for controlling the movements of the log carrier.

According to my invention, the arrangement is provided with an electric motor controlling the movements of the log carrier while switches are adapted to cut off the electric circuit feeding the motor with current after a predetermined shifting of the log carrier.

The circuit feeding the motor is associated for adjustment with two cooperating contact-pieces of which one assumes a stationary position on the log-carrier while the other is adapted to slide over said log-carrier during the sawing operation while remaining stationary with reference to the carriage, whereby the two contact-pieces are adapted to come into contact with one another in order to provide for the stopping of the motor through energization of a relay.

The second contact-piece referred to may be rigidly secured to an electromagnet, the armature of which comes into contact with the carriage and engages the latter during operation of the motor in a manner such as will provide the sliding of the contact piece together with the carriage, with reference to the log-carrier.

The contact-carrying electromagnet may be connected with the log carrier through a spring that is stretched during the progression of the log-carrier and relaxes when the electromagnet is deenergized in order to return the latter into its original position on the log carrier.

The control switch provided for starting the motor may be furthermore held in its closed position during the energization of the latter through a further electromagnet that is energized by the passage of current.

The stopping of the motor may be provided, as stated, through an electromagnetic relay, the energization of which produces the opening of the motor circuit.

The first contact-piece provided for adjustment of the depth of cut may be secured to the log carrier at an adjustable point thereof, a lever controlling the position of said contact piece and defining the depth of the saw cut.

The circuit feeding the motor may also include a further electromagnet controlling the engagement and disengagement of the means producing the progression of the log carrier. The arrangement may also include an electromagnet controlling the engagement and disengagement of the means producing the return motion of the log carrier.

Lastly, the two contact pieces adjusting the depth of cut may be carried on members adapted to slide inside one another and allowing a relative shifting of the normal position of the two contact pieces on the log carrier.

I will now describe a preferred embodiment of my invention as illustrated in accompanying drawings and disclosed by way of a mere exemplification. In said drawings.

Figure 1:
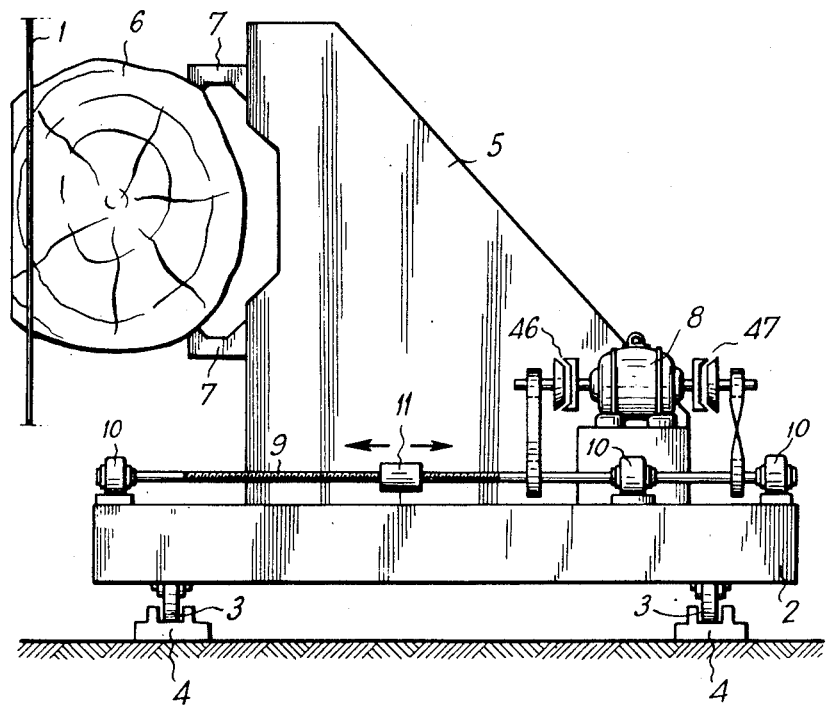
Fig. 1 is an end view of a device according to the invention, the saw blade of which is illustrated only partly.

As illustrated, the sawing machine includes a blade 1 only a section of which is illustrated, a carriage 2 the rollers 3 of which run in grooves 4 or on rails, and a log carrier 5 to which the log 6 is secured through the hooks or teeth 7.

A motor 8 provides for the rotation of a screw 9 one end of which is held fast against longitudinal motion by a bearing 10 rigid with the carriage 2. A tapped sleeve 11 rigidly secured to the log carrier 5 is threaded over the screw 9 and the rotation of the latter provides for the progression of the log carrier in the direction of the arrow F or in the opposite direction.

A lever 12 moving in front of a scale 13 is adapted to adjust the depth of progression of the log carrier 5 towards the saw blade 1 as disclosed hereinafter.

Of course the motor 8 may control the progression of the log carrier through means different from the screw 9 and associated sleeve 11, that have been described by way of an example only.

Figure 2:
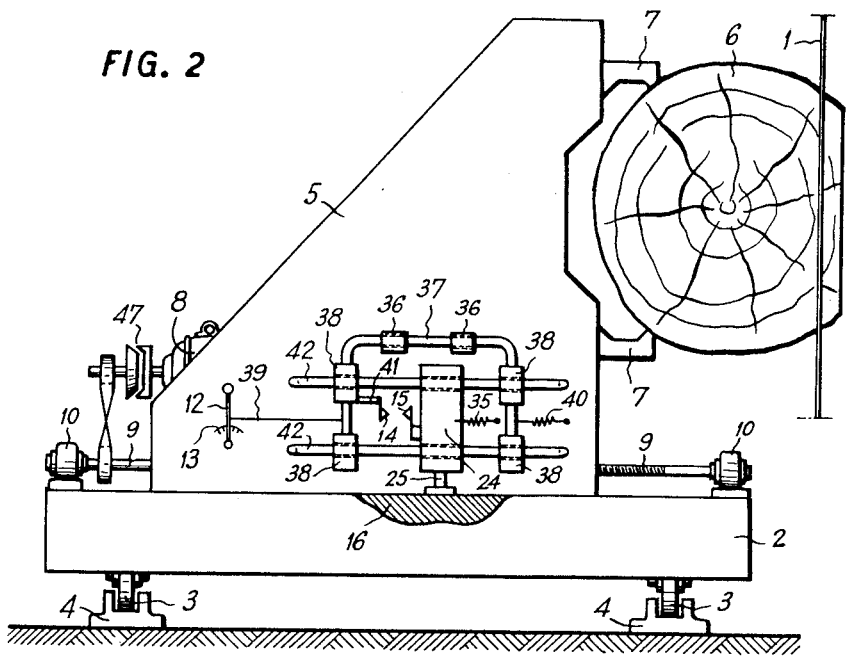
Figure 2 is a rear view of the device shown in Figure 1.
Figure 3:
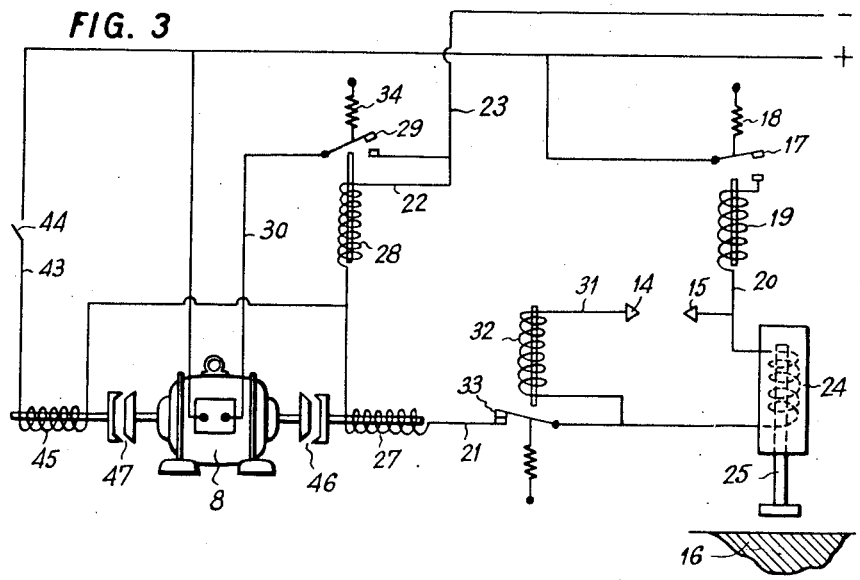
Fig. 3 is a wiring diagram serving for the control of the motor driving the log carrier.

The log carrier 5 is provided with two contact-pieces 14 and 15 (Figs. 2 and 3), of which the former moves together with the log carrier 5 while the contact-piece 15 is adapted to slide with reference to the log carrier and to assume, when the circuit is closed, a stationary position with reference to the carriage 2, a portion 16 of which is illustrated diagrammatically in Fig. 3.

The circuit controlling the motor 8 includes a switch 17 (Fig. 3) adapted to start the motor running and associated with a spring 18 that urges it constantly into its open position. An electromagnet 19 is inserted in series in the circuit and its armature holds the switch 17 in its closed position during the passage of the current.

As soon as the switch 17 is closed, current passes through the circuit 20—21—22—23 so as to energize the electromagnet 24 the armature 25 of which engages then adhesively the portion 16 of the carriage 2. Consequently the contact-piece 15 that moves in unison with the electromagnet 24 will then assume a stationary position with reference to the carriage 2.

An electromagnet 27 in the circuit 21 that is also energized through the passage of current controls the engagement of the means such as a clutch 46 controlling the progression of the log carrier over the carriage.

Lastly, the electromagnet 28 that is also energized closes the switch 29 in the circuit of the motor 8. The closing of the contact piece 17 produces consequently the progression of the log carrier 5.

By reason of the latter carrying along with it a contact piece 14 while the cooperating contact piece is stationary with reference to the carriage 2, the contact pieces 14 and 15 move with reference to one another and close finally a circuit 31 including an electro-magnet 32 adapted to open a switch 33 in the circuits 20—21—22 controlling the motor circuit. The electromagnet 28 is thus deenergized and allows the switch 29 in the motor circuit 30 to open under the action of the spring 34. Furthermore, the lack of current provides for the release of the armature 25 that is no longer adherent to the portion 16 of the carriage 2, so that the electromagnet 24 carrying the contact piece 15 may slide back into its original position with reference to the log carrier 5 under the action of a spring 35 (Fig. 2). Lastly, as soon as no current passes any longer through the circuit, the switch 17 opens under the action of its spring 18.

Fig. 2 illustrates a preferred embodiment of the contact pieces 14 and 15 and carriers therefor.

The log carrier 5 is provided with sleeves 36 slidingly engaging a rod 37 carrying further sleeves 38. The location of the sleeves 38 at either end of the rod 37 is defined by the lever 12 mentioned hereinabove acting through the agency of a cable 39 that is held taut through the spring 40.

The contact-piece 14 is carried by a rod 41 rigid with one of the sleeves 38. The electromagnet 24 with its contact piece 15 is secured to rods 42 slidingly carried in their turn in the sleeve 38.

Of course the arrangement of the carriers for the contact-pieces 14 and 15 may be submitted to detail modifications and the rods 42 and sleeves 38 may be replaced by any system providing similar results.

The arrangement may also include a circuit 43 in which are inserted in series a switch 44 and an electro-magnet 45 controlling the engagement of the means such as another clutch 47 controlling the return motion of the log carrier 5.

Power saws provided with the above disclosed arrangement require only one attendant for their operation. The same workman may control the movements of the carriage 2 and the forward and receding movements of the log carrier 5 through operation of the switches 17 or 44, the thickness of the boards cut being adjusted through the lever 12.

What I claim is:

1. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage, passing through the first contact-piece, means whereby the second contact-piece is held stationary with reference to the carriage during the operative progression of the log carrier, an auxiliary circuit closed through the meeting of said contact pieces for a predetermined position of the log carrier with reference to the carriage and a relay in the auxiliary circuit adapted to deenergize the motor circuit when energized.

2. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage, passing through the first contact-piece, a primary circuit adapted to be closed at the start of each operative stroke of the log carrier, a relay in said primary circuit providing for the transient adherence between the second contact piece and the carriage to hold it stationary with reference to the latter during the operative progression of the log carrier, an auxiliary circuit closed through the meeting of said contact pieces for a predetermined position of the log carrier with reference to the carriage and a relay in the auxiliary circuit adapted to deenergize the motor circuit when energized.

3. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage, passing through the first contact-piece, a primary circuit in shunt relationship with the motor circuit and adapted to be closed at the start of each operative stroke of the log carrier, a relay in said primary circuit providing for the transient adherence between the second contact piece and the carriage to hold it stationary with reference to the latter during the operative progression of the log carrier, an auxiliary circuit associated with the primary circuit and closed through the meeting of said contact pieces for a predetermined position of the log carrier with reference to the carriage and a relay in the auxiliary circuit adapted to deenergize the motor circuit when energized, a further electromagnet in the primary circuit, a switch in the primary circuit held closed by the operation of last mentioned electromagnet and a spring adapted to open said switch as soon as said last-mentioned electromagnet is deenergized.

4. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage, passing through the first contact-piece, a primary circuit adapted to be closed at the start of each operative stroke of the log carrier, a relay in said primary circuit providing for the transient adherence between the second contact piece and the carriage to hold it stationary with reference to the latter during the operative progression of the log carrier, a spring connecting the second contact-piece with the log-carrier to constrain the latter to remain in a predetermined position with reference to the latter when said relay is inoperative, an auxiliary circuit closed through the meeting of said contact pieces for a predetermined position of the log carrier with reference to the carriage and a relay in the auxiliary circuit adapted to deenergize the motor-circuit when energized.

5. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage, passing through the first contact-piece, a primary circuit adapted to be closed at the start of each operative stroke of the log carrier, a relay in said primary circuit providing for the transient adherence between the second contact piece and the carriage to hold it stationary with reference to the latter during the operative progression of the log carrier, an auxiliary circuit closed through the meeting of said contact pieces for a predetermined position of the log carrier with reference to the carriage and a relay in the auxiliary circuit adapted to deenergize the motor circuit when energized, means controlling the forward operative movements of the log carrier, a clutch between the motor and said means and an electromagnet in the primary circuit adapted, when energized, to provide for engagement of said clutch.

6. In a sawing machine, the combination of a saw blade, a carriage adapted to move in front of said blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage, passing through the first contact-piece, a primary circuit adapted to be closed at the start of each operative stroke of the log carrier, a relay in said primary circuit providing for the transient adherence between the second contact piece and the carriage to hold it stationary with reference to the latter during the operative progression of the log carrier, an auxiliary circuit closed through the meeting of said contact pieces for a predetermined position of the log carrier with reference to the carriage and a relay in the auxiliary circuit adapted to deenergize the motor circuit when energized, means controlling the forward operative movements of the log carrier, a clutch between the motor and said means and an electromagnet in the primary circuit adapted, when energized, to provide for engagement of said clutch, means controlling the return movement of the log carrier, a further clutch operatively connecting said means with the motor, a supplementary circuit, a switch adapted to close said supplementary circuit and a relay in said supplementary circuit adapted, when energized, to provide for the energization of last mentioned clutch.

7. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact piece, a carrier for the contact-piece adapted to be positioned adjustably on the log-carrier along a line parallel to the line of travel of the latter over the log-carrier, a spring urging said contact-piece carrier into a predetermined direction, a lever adapted to control the position of the contact-piece in antagonism with the last mentioned spring, a cooperating contact-piece slidingly carried by the log carrier, along a line parallel to the line of travel of the latter over the carriage, passing through the first contact-piece, means whereby the second contact-piece is held stationary with reference to the carriage during the operative progression of the log carrier, an auxiliary circuit closed through the meeting of said contact pieces for a predetermined position of the log carrier with reference to the carriage and a relay in the auxiliary circuit adapted to deenergize the motor circuit when energized.

8. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact piece, a carrier for the contact-piece adapted to be positioned adjustably on the log-carrier along a line parallel to the line of travel of the latter over the log-carrier, a spring urging said contact-piece carrier into a predetermined direction, a lever adapted to control the position of the contact-piece in antagonism with the last mentioned spring, a cooperating contact-piece slidingly carried by the log carrier, along a line parallel to the line of travel of the latter over the carriage, passing through the first contact-piece, means whereby the second contact-piece is held stationary with reference to the carriage during the operative progression of the log carrier, a spring urging the second contact-piece into a predetermined position with reference to the log-carrier when the last-mentioned relay is inoperative, an auxiliary circuit closed through the meeting of said contact pieces for a predetermined position of the log carrier with reference to the carriage and a relay in the auxiliary circuit adapted to deenergize the motor circuit when energized.

9. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage passing through the first contact-piece, a primary circuit in shunt relationship with the motor circuit, said primary circuit being adapted to be closed at the start of each operative stroke of the log carrier, a relay in said primary circuit providing for the transient adherence between the second contact piece and the carriage to hold it stationary with reference to the latter during the operative progression of the log carrier, an auxiliary circuit shunted across said relay, including the two contact-pieces and adapted to close through the meeting of said contact-pieces for a predetermined position of the log-carrier with reference to the carriage, a relay in the auxiliary circuit, a switch in the primary circuit adapted to deenergize same under the action of the energization of last mentioned relay, a further relay in the primary circuit and a switch in the motor circuit adapted to deenergize the motor under the action of said further relay.

10. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage, passing through the first contact-piece, means whereby the second contact-piece is held stationary with reference to the carriage during the operative progression of the log carrier, an auxiliary circuit closed through the meeting of said contact pieces for a predetermined position of the log carrier with reference to the carriage, an electromagnetic relay in the auxiliary circuit, a primary circuit, a switch in said primary circuit adapted to open the latter under the action of the energized electromagnetic relay in the auxiliary circuit, a further electromagnetic relay in the primary circuit and a switch in the motor circuit controlled by said further relay to close said motor circuit as long as said further relay is energized through the primary circuit.

11. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a contact-piece rigid with the log carrier, a cooperating contact-piece slidingly carried by the log carrier, along a line parallel to the line of travel of the latter over the carriage, passing through the first contact-piece, means whereby the second contact-piece is held stationary with reference to the carriage during the operative progression of the log carrier, an auxiliary circuit closed through the meeting of said contact pieces for a predetermined position of the log carrier with reference to the carriage, an electromagnetic relay in the auxiliary circuit, a primary circuit, a switch in said primary circuit adapted to open the latter under the action of the energized electromagnetic relay in the auxiliary circuit, a further electromagnetic relay in the primary circuit and a switch in the motor circuit controlled by said further relay to close said motor circuit as long as said further relay is energized through the primary circuit, and hand-operable means for closing the primary circuit.

12. In a sawing machine, the combination of a saw blade, a carriage adapted to move in front of said saw blade, a log carrier slidingly carried by said carriage and adapted to move over same in a direction perpendicular to the line of action of the saw blade, an electric motor controlling the movement of the log carrier over the carriage, a circuit feeding the motor, a sliding carrier adapted to slide adjustably over the log-carrier in the direction of travel of the latter over the carriage, means for adjusting the position of said sliding carrier with reference to the log carrier, a contact piece rigid with said sliding carrier and adapted to move therewith in unison with the log carrier, a second sliding carrier adapted to slide over the first sliding carrier in the same direction, electromagnetic means controlled by the starting of the operative stroke of the log-carrier and adapted to hold the second sliding carrier in a stationary position with reference to the carriage, yielding means urging the second sliding carrier back into a predetermined position with reference to the log carrier when the electromagnetic means are inoperative, a second contact-piece carried by the second sliding carrier and adapted to engage the first contact piece for a predetermined relative position of the second sliding carriage with reference to the first sliding carriage, an auxiliary circuit energized through the meeting of said contact-pieces, and a relay in said auxiliary circuit adapted, when energized, to deenergize the motor circuit and the electromagnetic means holding the second sliding carrier.

RODOLPHE MASUY.

REFERENCES CITED

The following references are of record in the file of this patent:

UNITED STATES PATENTS

| Number | Name | Date |
| --- | --- | --- |
| 2,007,180 | Doran et al. | July 9, 1935 |
| 2,175,822 | Best | Oct. 10, 1939 |
| 2,342,967 | Peters | Feb. 29, 1944 |

FOREIGN PATENTS

| Number | Country | Date |
| --- | --- | --- |
| 187,980 | Great Britain | Dec. 4, 1924 |
| 840,189 | France | Jan. 11, 1939 |